July 14, 1970 O. T. HEAD, JR 3,520,253
PLATE ALIGNING MEANS FOR COLOR PRINTING PRESSES
Filed May 9, 1967 2 Sheets-Sheet 1
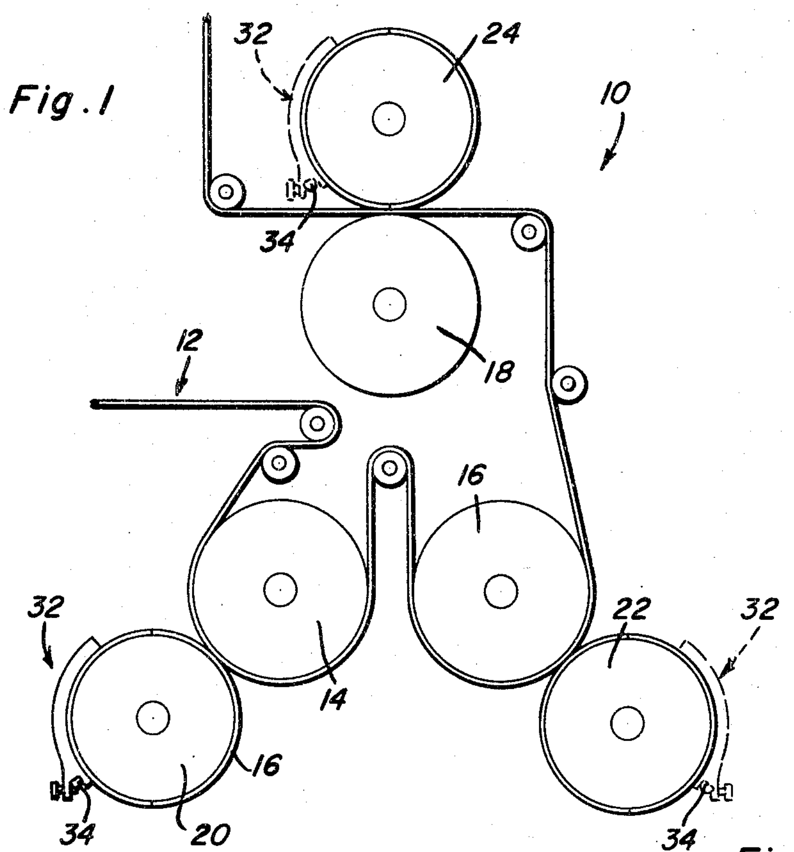
Fig. 2
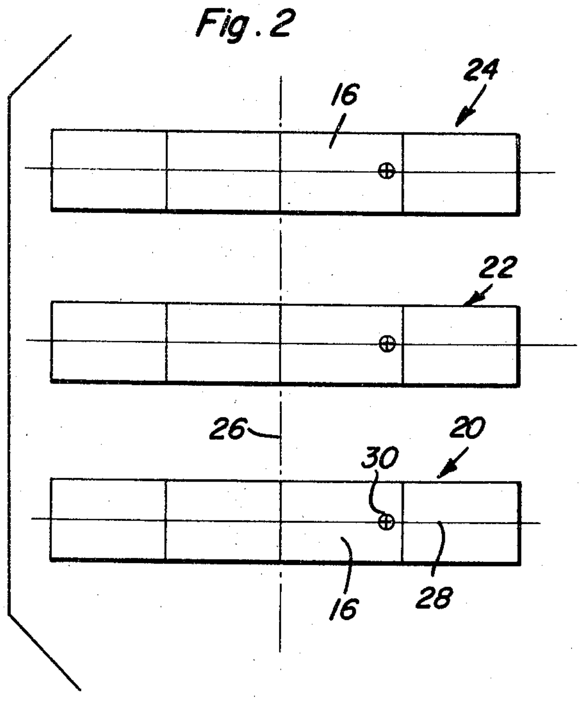
Fig. 3
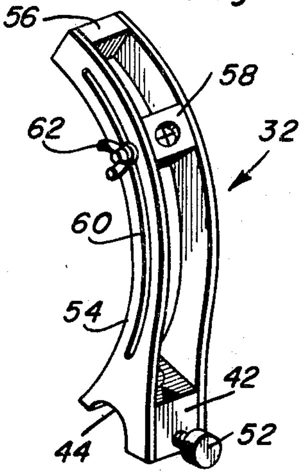
Obie T. Head, Jr.
INVENTOR.
BY Clarence A. O'Brien and Harvey B. Jacobson
Attorneys July 14, 1970 O. T. HEAD, JR 3,520,253
PLATE ALIGNING MEANS FOR COLOR PRINTING PRESSES
Filed May 9, 1967 2 Sheets-Sheet 2
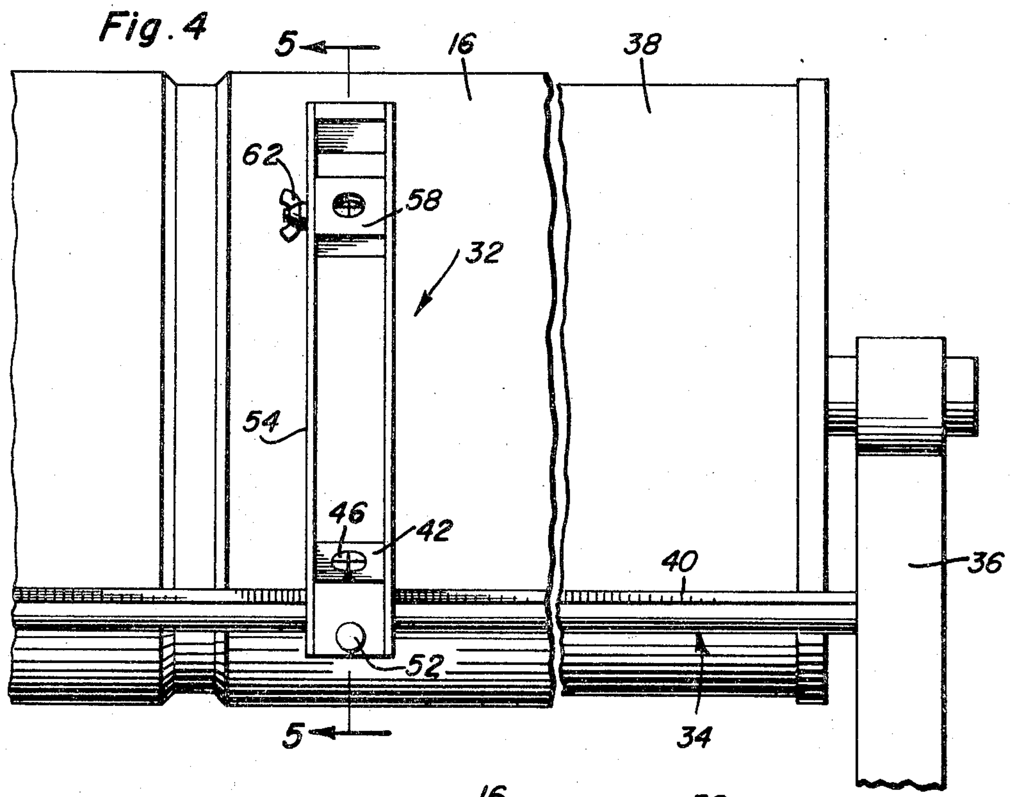
Fig. 5
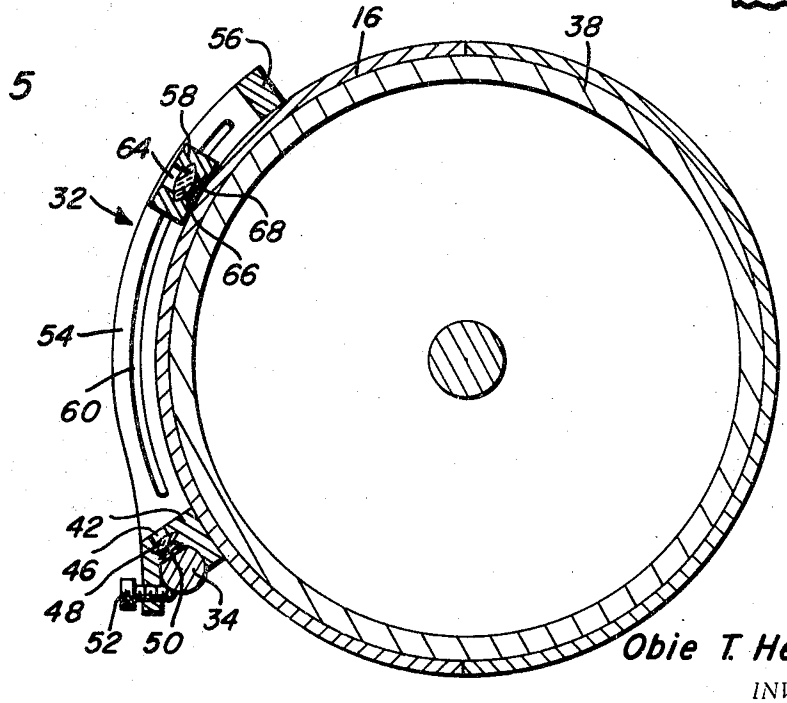
Obie T. Head, Jr.
INVENTOR.
BY Clarence A. O'Brien and Harvey B. Jacobson
Attorneys

United States Patent Office 3,520,253
Patented July 14, 1970

3,520,253

PLATE ALIGNING MEANS FOR COLOR PRINTING PRESSES

Obie T. Head, Jr., 1961 Valley Ridge Drive SW., Atlanta, Ga. 30331

Filed May 9, 1967, Ser. No. 637,241
Int. Cl. B41f *5/06, 13/12*
U.S. Cl. 101—181 3 Claims

ABSTRACT OF THE DISCLOSURE

The alignment of a plurality of color printing plates on the plate cylinders of a printing press by a preset aligning device transferred from one crossbar to another, after the device is set, and readings taken on a crossbar associated with the plate cylinder on which the first printing plates are mounted.

BACKGROUND OF THE INVENTION

This invention relates to the registration of a plurality of colors on a single sheet of newsprint, and more particularly to a method and apparatus whereby such color registration is achieved.

The registration of colors represents a problem in multicolor printing presses that often requires the expenditure of a considerable amount of itme and exercise of skill in adjusting the plates after the plates have been mounted thereon. Toward this end, alignment gaging devices are often mounted on a crossbar associated with each of the plate cylinders. Also, the plates are sometimes removed from the press and mounted on a jig in order to mount the printing plates thereon in gaged positions. Many hours of set up time are accordingly required and stops in order to register several color plates.

SUMMARY OF THE INVENTION

In accordance with the present invention, registration of colors printed on a roll of newsprint in a printing press, is achieved without removal of the plates from the press or adjustment thereof after the plates are mounted. Instead, proper alignment of the printing plates is accomplished by the adjustable positioning of the plates on the plate cylinders by means of an alignment device which has been preset in accordance with the position of an initially mounted printing plate on one of the plate cylinders. The alignment device is preset by means of the registration mark formed on the initially mounted printing plate so that the registration marks on the other printing plates may be aligned with a target on the alignment device which is sequentially transferred to the crossbars associated with the other plate cylinders.

The alignment device of the present invention therefore features facilities for being removably secured to the crossbar adjacent to each of the plate cylinders and facilities for reading its position along the crossbar from the centerline of the cylinder. A target viewing block is movably supported by the alignment device and locked in a set position so that the registration marks on the printing plates may be aligned therewith.

The alignment device of the present invention also features magnifying lenses through which reading of the scale on the corssbars and setting of the viewing block in alignment with the registration marks therewith is facilitated.

The alignment device and the method with which it is associated, is capable of being utilized on presses of various types including letter presses and offset presses to produce different types of printed matter such as forms, folded printed matter, etc.

These together with other objects and advantages which will become subsequently apparent reside in the details of construction and operation as more fully hereinafter described and claimed, reference being had to the accompanying drawings forming a part hereof, wherein like numerals refer to like parts.

BRIEF DESCRIPTION OF THE DRAWING FIGURES

FIG. 1 is a diagrammatic view of a typical printing press installation with which the apparatus and method of the present invention is associated.

FIG. 2 is a diagrammatic view of the printing plates arranged in alignment with each other.

FIG. 3 is a perspective view of the aligning device.

FIG. 4 is a partial front elevational view showing the mounting of the aligning device in a typical installation.

FIG. 5 is a transverse sectional view taken substantially through a plane indicated by section line 5—5 in FIG. 4.

DESCRIPTION OF THE PREFERRED EMBODIMENT

Referring now to the drawings in detail, FIG. 1 illustrates the installational arrangement in a typical multicolor printing press generally referred to by reference numeral 10 wherein a continuous sheet of newsprint or web 12 is entrained about a plurality of idle rollers and a plurality of impression cylinders 14, 17, and 18 that back the web while it is being printed. Printing ink is accordingly applied to the web sequentially by printing plates 16 mounted on the plate cylinders 20, 22 and 24 disposed in operative relation to each of the impression cylinders. The printing plates 16 on each of the plate cylinders apply ink of a different color to the web. It will be appreciated therefore, that the areas of the web to which ink is applied as it passes each of the plate cylinders, must be properly registered in order to produce the desired effect.

As diagrammatically shown in FIG. 2, each of the printing plate sections 16 associated with each of the plate cylinders 20, 22 and 24 is spaced a certain distance from the center line 26 associated with each of the cylinders. Also, each of the printing plates 16 must be in angular alignment with each other on each of the cylinders along the lines 28 parallel to the axes of the cylinders. Thus, each of the printing plates is provided with a registration mark 30 by means of which each printing plate is properly positioned when its registration mark is at the proper angle along the lines 28 and axially spaced by the proper distance from the centerline 26.

In accordance with the method of the present invention, an initial printing plate is mounted on a first of the plate cylinders such as the plate cylinder 20 in any conventional manner whether it be by means of clamps or adhesive. The aligning device of the present invention generally denoted by reference numeral 32 is then placed on the crossbar 34 associated with the plate cylinder 20. The aligning device 32 is shifted to the axial position of the registration mark on the mounted printing plate and set in accordance with the angular spacing of the registration mark from the crossbar. The aligning device 32 may then be removed from the crossbar associated with the plate cylinder 20 and placed on the crossbar associated with the plate cylinder 22 as shown by dotted line in FIG. 1. The aligning device 32 will be axially positioned from the centerline of the plate cylinder 22 by amounts gaged on the crossbar associated with the plate cylinder 20. The printing plates to be mounted on the plate cylinder 22 may then be positioned in accordance with the locations established by the aligning device 32 before they are secured in place on the plate cylinder. After the printing plates are so mounted on the plate cylinder 22, the aligning device 32 is then transferred to the crossbar associated with the plate cylinder 24 and the procedure repeated to adjust the position of the printing plates before mounting on the plate cylinder 24. Thus, after the printing plates are initially mounted on the first plate cylinder 20, they are sequentially mounted on the other plate cylinders at the same relative locations duplicated by means of the aligning device 32 sequentially transferred from the crossbar of one plate cylinder to the other for this purpose.

Referring now to FIGS. 3, 4 and 5, it will be observed that the aligning device 32 is associated with a plate cylinder rotatably mounted by the frame 36 of the printing press so that its cylindrical supporting surface 38 on which the printing plates 16 are mounted, is in close parallel spaced relation to the crossbar 34 fixedly mounted by the frame. The crossbar is noncircular in cross-section having a flat face 40 on which a scale may be mounted so that distances from the centerline of the cylinder may be gaged.

The aligning device includes a base 42 slidably mounted on the aligning bar. A recess 44 is formed in the base through which the crossbar extends presenting the flat, scaled face 40 to a scale reading opening 46 formed in the base above the crossbar. A magnifying lens 48 is mounted in the opening above a hairline indicator 50 to facilitate reading of the scale on face 40 in order to gage the distance of the device 32 from the centerline of the cylinder. The device may be locked in any adjusted position along the crossbar by any suitable locking means such as the setscrew 52 threadedly mounted by the base.

Connected to the base on opposite sides thereof and extending upwardly therefrom parallel to the cylindrical supporting surface 38 of the cylinder and perpendicular to its axis are a pair of arcuate side support arms 54 interconnected at the ends opposite the base 42 by a connector 56. Slidably mounted between the side support arms, is a target viewing block 58. A threaded shank may extend from the viewing block 58 through an arcuate slot 60 in one of the side supports in order to guide movement of the block along an arcuate path parallel to the cylindrical supporting surface 38. The viewing block may be locked in angular relation to the crossbar 34 by means of a wing nut lock 62 threadedly connected thereto.

The viewing block 58 includes an opening 64 within which a magnifying lens 66 is mounted above the crosshairs 68 adapted to be aligned with the registration marks 30 on the printing plates. It will be apparent therefore, that the aligning device 32 may be axially displaced along the plate cylinder on the crossbar and the viewing block 58 slidably displaced along its arcuate path until the registration mark 30 on a printing plate is viewed through lens 66. The axial distance of the aligning device may then be read on the scale face 40 of the crossbar and the target viewing block 58 locked in position. The aligning device is then set so as to establish the same locations for the registration marks on the other printing plates as aforementioned.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a printing press having a plurality of plate supporting surfaces adapted to transfer print to a web from printing plates having registration marks thereon, a plate position gaging device in combination with scaled aligning bars fixedly mounted in close spaced parallel relation to each of said supporting surfaces, said position gaging device comprising a support arm, means removably securing said arm on each of the aligning bars, scale reading means fixedly mounted by the arm for viewing the aligning bars, target viewing means slidably mounted by the arm for movement along a path parallel to the supporting surfaces for the printing plates, and means for locking the viewing means at an adjusted position on the arm sighting the registration marks on the printing plates, said viewing means including a magnifying lens, said arm including a pair of arcuate side supports between which the viewing means is slidably mounted and a mounting block interconnecting the side supports and mounting the removable securing means and the scale reading means.

2. The combination of claim 1 wherein said scale reading means includes a magnifying lens.

3. In a printing press having a plurality of plate supporting surfaces adapted to transfer print to a web from printing plates having registration marks thereon, a plate position gaging device in combination with scaled aligning bars fixedly mounted in close spaced parallel relation to each of said supporting surfaces, said position gaging device comprising a support arm, means removably securing said arm on each of the aligning bars, scale reading means fixedly mounted by the arm for viewing the aligning bars, target viewing means slidably mounted by the arm for movement along a path parallel to the supporting surfaces for the printing plates, and means for locking the viewing means at an adjusted position on the arm sighting the registration marks on the printing plates, said arm including a pair of arcuate side supports between which the viewing means is slidably mounted and a mounting block interconnecting the side supports and mounting the removable securing means and the scale reading means, said supporting surfaces being cylindrical.

References Cited

UNITED STATES PATENTS

| | | | |
|---|---|---|---|
| 1,965,216 | 7/1934 | Brown | 101—426 |
| 626,031 | 5/1899 | Osborne. | |
| 1,956,917 | 5/1934 | Fritsche | 33—184.5 |
| 2,104,553 | 1/1938 | Claybourn. | |
| 2,231,187 | 2/1941 | Hawley. | |
| 2,559,533 | 7/1951 | Daniels. | |
| 2,631,669 | 3/1953 | Baker. | |
| 2,633,076 | 3/1953 | Rineer. | |
| 2,907,274 | 10/1959 | Taylor | 33—184.5 XR |

ROBERT E. PULFREY, Primary Examiner

J. R. FISHER, Assistant Examiner

U.S. Cl. X.R.

33—184.5